United States Patent
Tsirkin

(10) Patent No.: US 11,055,186 B2
(45) Date of Patent: Jul. 6, 2021

(54) MANAGING RELATED DEVICES FOR VIRTUAL MACHINES USING ROBUST PASSTHROUGH DEVICE ENUMERATION

(71) Applicant: Red Hat, Inc., Raleigh, NC (US)

(72) Inventor: Michael Tsirkin, Westford, MA (US)

(73) Assignee: Red Hat, Inc., Raleigh, NC (US)

(*) Notice: Subject to any disclaimer, the term of this patent is extended or adjusted under 35 U.S.C. 154(b) by 111 days.

(21) Appl. No.: 16/202,028

(22) Filed: Nov. 27, 2018

(65) Prior Publication Data
US 2020/0167247 A1    May 28, 2020

(51) Int. Cl.
*G06F 11/20* (2006.01)
*G06F 9/455* (2018.01)
*G06F 13/40* (2006.01)

(52) U.S. Cl.
CPC ...... *G06F 11/2023* (2013.01); *G06F 9/45545* (2013.01); *G06F 9/45558* (2013.01); *G06F 13/4022* (2013.01); *G06F 13/4027* (2013.01); *G06F 2009/4557* (2013.01); *G06F 2201/805* (2013.01); *G06F 2201/815* (2013.01); *G06F 2213/0024* (2013.01)

(58) Field of Classification Search
CPC ............. G06F 11/2023; G06F 13/4027; G06F 9/45558; G06F 9/45545; G06F 13/4022; G06F 2201/815; G06F 2201/805; G06F 2213/0024; G06F 2009/4557
See application file for complete search history.

(56) References Cited

U.S. PATENT DOCUMENTS

| | | | |
|---|---|---|---|
| 7,743,389 B2 | 6/2010 | Mahalingam et al. | |
| 9,405,566 B2 | 8/2016 | Chawla et al. | |
| 2009/0119684 A1* | 5/2009 | Mahalingam | G06F 9/45558 719/324 |
| 2012/0198446 A1* | 8/2012 | Sawa | G06F 11/0766 718/1 |
| 2013/0185048 A1* | 7/2013 | Morelli, Jr. | G06F 9/5077 703/27 |
| 2014/0149985 A1* | 5/2014 | Takeuchi | G06F 9/45558 718/1 |
| 2017/0116071 A1* | 4/2017 | Arroyo | G06F 11/3027 |
| 2017/0249458 A1* | 8/2017 | Tsirkin | G06F 9/45558 |
| 2018/0285134 A1* | 10/2018 | Hotra | G06F 9/455 |

(Continued)

OTHER PUBLICATIONS

Cisco, "VPC-D1 System Administration Guide, Release 21.5", Cisco Systems, Inc., Published Nov. 30, 2017, 592 pages.

(Continued)

*Primary Examiner* — Yolanda L Wilson
(74) *Attorney, Agent, or Firm* — Lowenstein Sandler LLP

(57) ABSTRACT

Aspects of the disclosure provide for mechanisms for managing related devices for virtual machines in a computer system. A method of the disclosure includes: identifying, by a processing device executing a hypervisor, a first device and a second device to be assigned to a virtual machine, wherein the first device is a failover device of the second device; presenting, by the processing device, the first device to a guest operating system of the virtual machine as a bridge device; and presenting, by the processing device, the second device to the guest operating system of the virtual machine as residing behind the bridge device.

18 Claims, 10 Drawing Sheets

(56) References Cited

U.S. PATENT DOCUMENTS

2019/0068698 A1* 2/2019 Kumar ................ H04L 63/0428

OTHER PUBLICATIONS

Xen, "Xen PCI Passthrough", Nov. 25, 2016, 12 pages https://wiki.xenproject.org/wiki/Xen_PCI_Passthrough.
Rksyeung, "Access/query devices behind PCIe switch", Mar. 19, 2018, 3 pages https://www.linuxquestions.org/questions/linux-hardware-18/access-query-devices-behind-pcie-switch-4175625902/.

* cited by examiner

MANAGING RELATED DEVICES FOR VIRTUAL MACHINES USING ROBUST PASSTHROUGH DEVICE ENUMERATION

TECHNICAL FIELD

The implementations of the disclosure generally relate to computer systems and, more specifically, to managing related devices (a primary device and a failover device) for virtual machines using robust passthrough device enumeration.

BACKGROUND

Virtualization allows multiplexing of an underlying host machine between different virtual machines. The host machine allocates a certain amount of its resources to each of the virtual machines. Each virtual machine is then able to use the allocated resources to execute applications, including operating systems (referred to as guest operating systems). An executable layer that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer. A host machine can accommodate more virtual machines than the size of its physical memory allows. Using virtual memory techniques, the host machine can give each virtual machine the impression that it has a contiguous address space, while in fact the memory used by the virtual machine may be physically fragmented and even overflow to disk storage.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
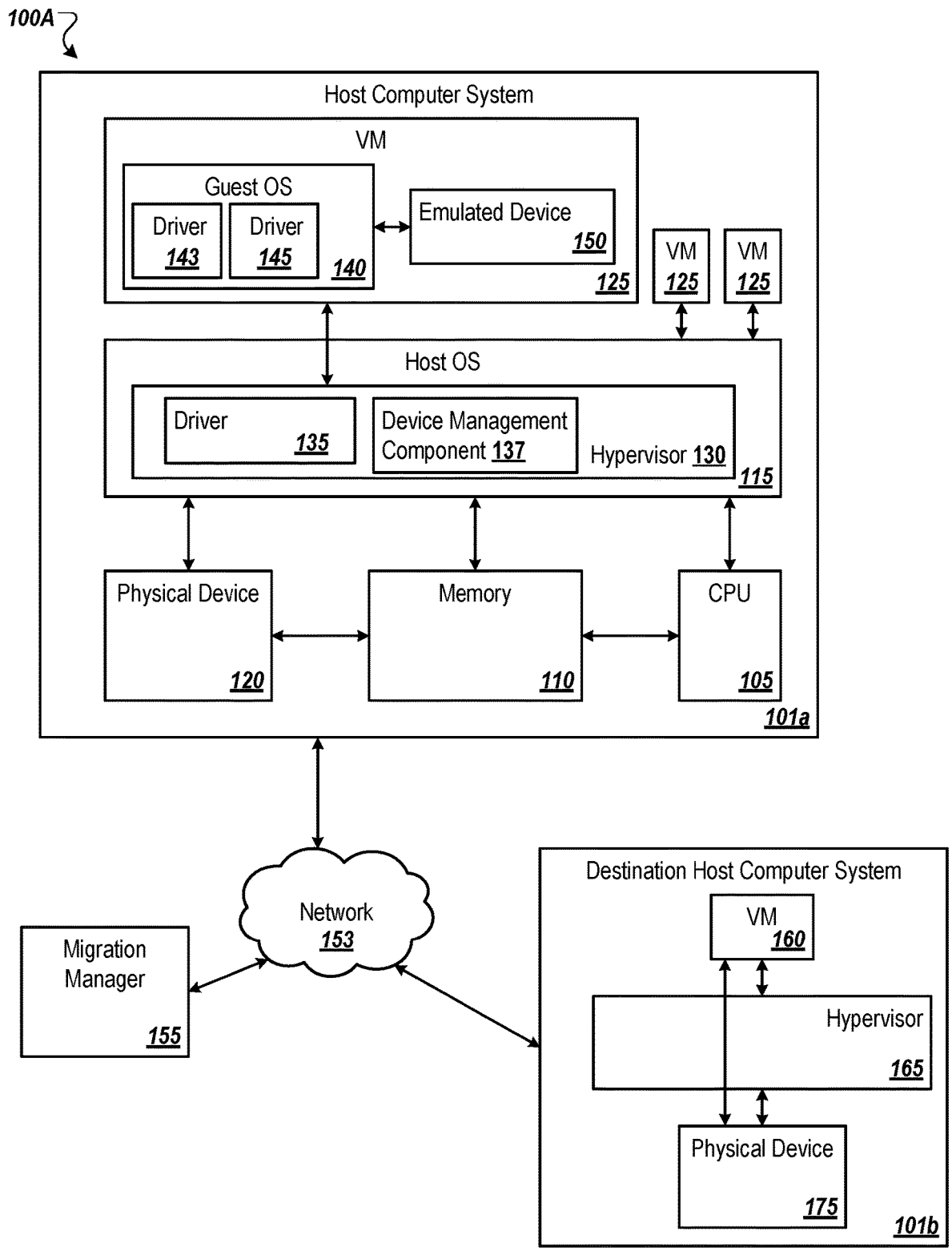
FIGS. 1A and 1B are block diagrams of computer systems in which implementations of the disclosure may operate.

The present disclosure pertains to managing related devices for a virtual machine. A host computer system ("host") provides computing resources (e.g., processing power, memory, storage, input/output (I/O) interfaces, devices, etc.) to a virtual machine (VM). The host computer system can use a hypervisor to control the VM's use of the computing resources. The hypervisor can expose devices of the host to the VM. Exposing devices of the host may involve making devices of the host available for use by the VM. Devices of the host can include, for example, storage devices, network devices, graphics devices, system components (e.g., bridges, ports, buses) media devices, (e.g., video cards, sounds cards), etc.

For example, the hypervisor can expose devices of the host to a VM via emulated devices or passthrough devices. Emulated devices are virtual devices within a VM that mimic physical (hardware) devices, allowing guest operating systems to work with the emulated devices using standard in-box drivers. Some emulated devices may be paravirtualized devices. The guest operating system may not include drivers for the paravirtualized devices. The hypervisor can cause the guest operating system to install these drivers automatically. A passthrough device of a VM is the host's device that can be used by the VM exclusively as set by the hypervisor. Device assignment allows the virtual machine to access the host's device directly or via a hypervisor for a range of tasks, and it allows the virtual machine to perceive the passthrough device as if it was attached to the guest operating system. The hypervisor can act as a passthrough for communications between the VM and the host device. Alternatively, the hypervisor can permit the VM to directly communicate with the host device without going through the hypervisor. In a hybrid approach, the hypervisor can act as a passthrough for some communications between the VM and the host device while for other communications, the hypervisor is not involved and the VM communicates with the host device directly. To mitigate any undesirable effects that may occur as a result of a device or operation failure, conventional systems permit multiple physical devices to be configured as a pair in a failover relationship. When one device (e.g., a primary device) experiences an error, for example, operations for that device can be moved (or failed over) to the other device (e.g., a failover device). The device roles then can switch—the failover device becomes the primary device and the primary device becomes the failover device.

The different types of devices (emulated or passthrough devices) can enable different features or configurations for a VM. In particular, resource overcommit can be available for one device type and not for another. Resource overcommit can include allocating more virtualized CPUs or memory to a VM than there are physical resources on the host computer system. In memory overcommit, virtual address space allocated to a VM exceeds the available physical address space in a host computer system. Because passthrough devices involve static memory allocation, resource overcommit may not be available for passthrough devices. Similarly, some device types can be used in conjunction with VM migration while others cannot. For example, emulated devices can be used during VM migration while passthrough devices cannot because they are not part of the VM being migrated. In contrast, passthrough devices can be used to increase performance of the VM.

To enable switches between a passthrough device and an emulated device, the passthrough device and/or the emulated device may be bound to a failover driver to implement device failover. In some embodiments, the failover driver may attempt to send any request first to a passthrough device. If the failover driver detects a failure related to the first device, the failover driver may then send the request to an emulated device (e.g., a paravirtualized device). However, the passthrough device, the emulated device, etc. may be enumerated in any order by a guest operating system of a virtual machine (the "guest"). As such, the guest may discover the passthrough device first and the passthrough device may thus be bound to a regular passthrough device driver instead of the failover driver. In addition, prior solutions for implementing device failover do not provide mechanisms that enable a device driver controlling the emulated device (e.g., a paravirtualized device driver) to detect presence of the passthrough device and to access the passthrough device.

Aspects of the present disclosure address the above and other deficiencies by providing mechanisms for managing related devices for virtual machines using robust passthrough device enumeration. For example, the mechanisms disclosed herein may manage devices in a failover relationship and other related devices for the virtual machine. In some embodiments, the mechanisms can identify a first device and a second device as being related to each other. The first device and the second device may be an emulated device and a passthrough device, respectively. The mechanisms may present the emulated device to a guest as a bridge device (e.g., a Peripheral Component Interconnect (PCI)-to-PCI bridge). The mechanisms may then present the passthrough device as a device residing behind the bridge device. The mechanisms may also associate the emulated device and/or the passthrough device with device data identifying a failover driver configured to cause the guest to switch between the emulated device and the passthrough device in view of failover events. For example, the mechanisms may set values of one or more registers of the emulated device and/or the passthrough device to values corresponding to the device data.

As the emulated device is presented to the guest as the bridge device, the guest may discover the emulated device as the bridge device before the guest discovers the passthrough device as a device behind the bridge device. As such, the emulated device may be enumerated before the passthrough device. The guest may then bind the passthrough device to the failover driver in view of the device data.

Accordingly, the systems and methods described herein include technology that enhances virtualization technology for a computer system. The technology may enable enhanced device management for virtual machines by presenting an emulated device as a bridge device and a failover device of the emulated device (e.g., a passthrough device) as a device residing behind the bridge device. As such, the technology ensures that the passthrough device is enumerated after a failover driver handing device failover is discovered and may thus ensure that the passthrough device is bound to the failover driver. Compared to conventional virtualization techniques, the mechanisms disclosed herein may enable efficient device failover without modifying an existing operating system of the virtual machine.

For brevity, simplicity and by way of example, a hypervisor performs many of the operations described herein. It is contemplated that other actors may perform some or all of the operations described herein, including a host operating system, multiple hypervisors, a migration manager, and the like, including a combination thereof. Further, described herein are techniques for switching between a primary device and a failover device. While examples described herein describe switching between a passthrough device and an emulated device, switching between any device, types of devices or between devices of the same type is contemplated.

FIG. 1A is a block diagram that illustrates an example computing system architecture 100A in which embodiments may operate. The computing system 100A may include a host computer system 101 that hosts one or more virtual machines (VM) 125. Each VM 125 runs a guest operating system (OS) 140. The VMs 125 may have the same or different guest operating systems 140, such as Microsoft Windows®, Linux®, Solaris®, Mac® OS, etc. The host computer system 101 may be a server, a workstation, a personal computer (PC), a mobile phone, a palm-sized computing device, a personal digital assistant (PDA), etc.

The host computer system 101 may run a hypervisor 130 to virtualize access to the underlying host hardware, making the use of the VM 125 transparent to the guest OS 140 and a user of the host computer system 101. The hypervisor 130 may also be known as a virtual machine monitor (VMM) or a kernel-based hypervisor. The hypervisor 130 may be part of a host OS 115, run on top of the host OS 115, or run directly on the host hardware without an operating system beneath it.

The host computer system 101 may include hardware components such as one or more physical central processing units (CPUs) 105, memory 110 (also referred to as "host memory" or "physical memory") and other hardware components. In one implementation, the host computer system 101 includes one or more physical devices 120 (also referred to as "physical devices," or "host devices"), such as audio/video devices, network interface devices, printers, graphics modules, etc. For simplicity of the illustration, one physical device 120 is shown. It is understood that the host computer system 101 may include any number of physical devices. The physical device 120 can be any type of device, including a data storage device or mass storage device, such as a magnetic or optical storage based disk, tape or hard drive. Other examples of physical devices 120 include network devices, graphics devices, system components (e.g., bridges, ports, buses) media devices, (e.g., video cards, sounds cards, etc.).

The hypervisor 130 can assign a physical device 120 to a VM 125 and can expose the physical device 120 to a guest OS of the VM 125 as port of the VM 125. The physical device is also referred to as a passthrough device. The assignment of the passthrough device to the VM 125 may enable the guest OS of the VM 125 to have direct access to the physical device 120. In some embodiments, when the physical device 120 is assigned to the VM 125, the physical device 120 cannot be assigned to another VM. In some embodiments, migration of the VM 125 and/or memory overcommitment of the VM 125 may be disabled when the physical device 120 is assigned to the VM 125.

The hypervisor 130 can request that the guest OS 140 use the passthrough device. The hypervisor 130 can give the guest OS 140 direct access to the passthrough device (physical device 120) such that communications between the guest OS 140 and the passthrough device 120 are not routed through the hypervisor 130. In other implementations, communications between the guest OS 140 and the passthrough device 120 can pass through the hypervisor 130 and the hypervisor 130 redirects the communications between the passthrough device 120 and the guest OS 140 without modifying these modifications (e.g., passthrough).

In some embodiments, when the hypervisor 130 assigns a device to the VM 125, the hypervisor 130 can also indicate that the passthrough device needs a companion device for failover. The companion device can be a device that is emulated by the VM 125 (e.g., emulated device 150). The emulated device 150 may use the physical device 120 or any other suitable physical device as a backend. The emulated device 150 may be a device implemented by the hypervisor 130 and may be exposed to the guest OS 140 as part of the VM 125. The emulated device may be a virtual device that mimics real hardware and may be implemented using full emulation. In some embodiments, the emulated device 150 may be a paravirtualized device implemented using paravirtualization. In such implementation, the device driver associated with the emulated device 150 does not work on the hardware of the host computer system 101*a*.

The guest OS 140 may include one or more device drivers 143 and 145 to enable functionality of the passthrough device and/or the emulated device 150. The device driver 143 may enable functionality of the emulated device 150 and is also referred to as the "emulated device driver." In some embodiments, the emulated device 150 may be a paravirtualized device controlled by the emulated device driver 143. In such embodiments, the emulated device may be implemented using paravirtualization such that the emulated device driver 143 does not work on the hardware coupled to the host 101*a*.

In some embodiments, the device driver 145 may be a failover driver that may provide failover functionality. The failover driver may be configured to cause the VM 125 to switch between the passthrough device and the emulated device 150 in view of failover events. For example, the failover driver 145 may attempt to send a request to perform an operation (e.g., an I/O operation) to the passthrough device first. In response to determining that the passthrough device is not available for the request and/or detecting any other failover event related to the passthrough device, the failover driver 145 may send the request to the emulated device 150.

The hypervisor 130 can define the failover relationship between the passthrough device and the emulated device 150 and can provide a notification to the guest OS 140 that the two devices are available for a failover relationship. In some embodiments, the hypervisor 130 can transmit to the guest OS 140 a request indicating a failover event. The failover event can involve or trigger a switch from the passthrough device to the emulated device 150. The request can be, for example, a hot unplug request, operation failure report, or terminate request. The hypervisor 130 can leverage the failover relationship to enable desired features (e.g., migration capability or resource overcommit capability) to the VM and/or to regulate performance of the VM. The guest OS 140 receives the request and transmits an acknowledge message to the hypervisor 130 to initiate a failover. Once the hypervisor 130 receives the acknowledge message from the guest OS 140, the hypervisor 130 can prevent guest OS 140 from accessing the passthrough device (e.g., protect the passthrough device from guest OS 140 access). To prevent the guest OS 140 from accessing the passthrough device, the hypervisor 130 can update a data structure, such as a page table or an internal hypervisor data structure, with instructions to forward requests intended for the passthrough device to the emulated device 150.

The device driver 135 may enable the guest OS of VM 125 to access the physical device 120 as a passthrough device. For example, the device driver 135 may receive requests from and passes requests to a particular guest when a device is assigned to the particular guest.

Before the guest OS 140 can switch to the emulated device 150, the hypervisor configures the emulated device 150 for use. To configure the emulated device 150, the hypervisor 130 can start or associate a driver 135 in the hypervisor that is specific to the physical device 120. The hypervisor 130 can then expose the emulated device 150 to the guest OS 140. The guest OS 140 can access the emulated device 150 using the device driver 143. Once the emulated device 150 is configured, the hypervisor 130 can provide a notification to the guest OS 140 that the emulated device 150 is available for use. The guest OS 140 can then use the emulated device 150 for regular functionality or special functionality, such as for resource overcommit, migration, and the like. In some embodiments, if the hypervisor 130 identifies an access request or message addressed to the emulated device during the switch (before the switch is completed), the hypervisor 130 can hold the access request or message. Upon receiving a notification that the guest OS 140 is ready to use the emulated device 150, the hypervisor 130 can transmit the access request or message to the emulated device 150. When the guest OS 140 communicates with the emulated device 150 (e.g., to write data to, or read data from the emulated device 150), the hypervisor 130 detects these communications and propagates them to the physical device 120.

To switch from the emulated device 150 to passthrough device, the hypervisor 130 can take actions similar to those taken when switching from the passthrough device to the emulated device 150. The hypervisor 130 can transmit a switch-back request to the VM. The switch-back request can be in any form, such as a request to unplug the emulated device 150 (e.g., such as when migration is complete), virtual device failure report, or terminate request (e.g., terminate overcommit), etc. The hypervisor 130 can disassociate the device driver 135 in the hypervisor 130 from the backend physical device 120. The hypervisor 130 can expose the passthrough device to the guest OS. The hypervisor can also update a data structure, such as a page table or an internal hypervisor data structure, with instructions to forward requests intended for the emulated device 150 to the passthrough device. The hypervisor 130 can then provide a request to the guest OS 140 to switch to the passthrough device.

In some implementations, hypervisor 130 (e.g., in response to a system administrator request) can initiate a resource overcommit for the VM 125. To facilitate the resource overcommit, the hypervisor 130 can instruct the guest OS 140 to "failover" or switch from the passthrough device to the emulated device 150, as described herein. When overcommit is no longer desired, the hypervisor 130 can instruct the guest OS 140 to failover or switch back to the passthrough device. In one example, resource overcommit is enabled for execution of a specific program. The hypervisor 130 determines or identifies when the program execution is complete and initiates the switch back to the passthrough device.

In another implementation, the hypervisor can initiate the switch in response to a VM migration request. The request can come from a migration manager 155, system administrator, etc. For VM migration, the VM 125 switches to the emulated device 150 using techniques described herein. The VM migration can be to another VM on the same host computer system 101*a* or to another host computer system 101*b* (e.g., a destination host computer system), such as over a network 153. When the VM migration is complete, the hypervisor (on the same host 101*a* or the destination host 101*b*) may instruct the guest OS of the migrated VM to switch to a passthrough device (physical device 120 on the same host 101*a* or physical device 180 on the destination host 101*b*). In one implementation, the physical device 180 of the destination host 101*b* is the same make and model device as physical device 120 of the source computer system 101*a*. In another implementation, the physical device 120 and the physical device 180 are not the same make and/or model but perform a similar function (e.g., video card, storage device, etc.).

In one implementation, the request to switch is a hot unplug request or a terminate request. In another implementation, the request is an operation failure report. For example, if the passthrough device and emulated device 150 are networking devices, an operation failure report can indicate that a networking link is broken. To try another link that might work, the guest OS 140 can switch to the emulated device 150. The operation failure report can be for any type of failure for any type of device, such as a read or write error for a storage device, and the like.

As illustrated, the hypervisor 130 may include a device management component 137 that can manage related devices for one or more VMs, such as devices in a failover relationship and other related devices for a VM 125. For example, the device management component 137 can associate the passthrough device with the emulated device 150 as failover devices. The device management component 137 can then cause the VM 125 to switch between the passthrough device and the emulated device in view of failover events. To associate the passthrough device with the emulated device 150, the device management component 137 can present the emulated device 150 to the guest OS 140 as a bridge device. The device management component 137 can then present the passthrough device as a device residing behind the bridge device. The device management component 137 may present the emulated device 150 and the passthrough device as a virtual PCI-to-PCI bridge and an I/O device 194A of FIG. 1B, respectively. The device management component 137 may perform one or more operations described in connection with FIG. 1B.

The device management component 137 may also associate device data related to the failover driver 145 with the passthrough device and/or the emulated device 150. The device data may include, for example, a vendor identifier (ID) and a device ID. The device management component 137 may associate the device data with the passthrough device and/or the emulated device 150 by setting one or more values of one or more registers of the passthrough device and/or the emulated device 150 (e.g., a vendor ID register and/or a device ID register of a PCI configuration space) to corresponding to the device data.

The guest OS 140 can identify a connected bus and assign it an identifier (e.g., a bus number) when the VM 125 is initialized or in view of other event. The guest OS 140 can then send a probe for available devices to any connected buses. Each available device can respond to the probe by informing the computing system it is available to receive an address. The guest OS 140 can then assign addresses to the detected devices in an address assignment operation. The probe, the response to the probe, and the address assignment operation can be part of an initialization transaction for a device. The guest OS 140 can also detect when a new device is connected to the VM 125 and can assign an address to the new device using the initialization transaction. The guest OS 140 can keep a system list of the available devices and their respective addresses in a register.

When the guest OS 140 detects a bridge connected to a bus, it can determine that there is a second bus on the other side of the bridge, and can assign an identifier for the second bus (e.g., a bus number). The system list can be updated to include this second bus. The computing system can then probe the second bus for available devices and assign addresses to any identified devices using an initialization transaction, as described above. If another bridge is detected on the second bus, the computing system can repeat the above steps until no further bridges are detected. Once all available devices and bridges are identified, the computing system can compile a system list of all available devices and bridges, along with their respective addresses and identifiers. The guest OS 140 can send at least a portion of the system list to each bridge within the system. The portion of the system list that a bridge can receive can include a range of addresses for all devices behind the bridge that the bridge can use to identify and forward communications to devices behind it. Hence, in conventional computing systems, bridges become aware of device addresses after the computing system has identified all available devices and bridges and has assigned addresses to the available devices.

The guest OS 140 may scan available PCI devices as described above and may identify the emulated device 150 as a bridge device. The guest OS 140 may then match the device data associated with the emulated device 150 (e.g., values of the vendor ID register and the device ID register) to the device data related to the failover driver 145. The guest OS 140 may then bind the emulated device with the failover driver 145. The guest OS 140 may further identify the passthrough device as a device residing behind the bridge device. The guest OS 140 may bind the passthrough device to the failover driver 145.

In some embodiments, the device management component 137 include one or more components as described in connection with FIG. 2 and may perform various operations discussed herein with reference to FIGS. 3-8.

Figure 1B:
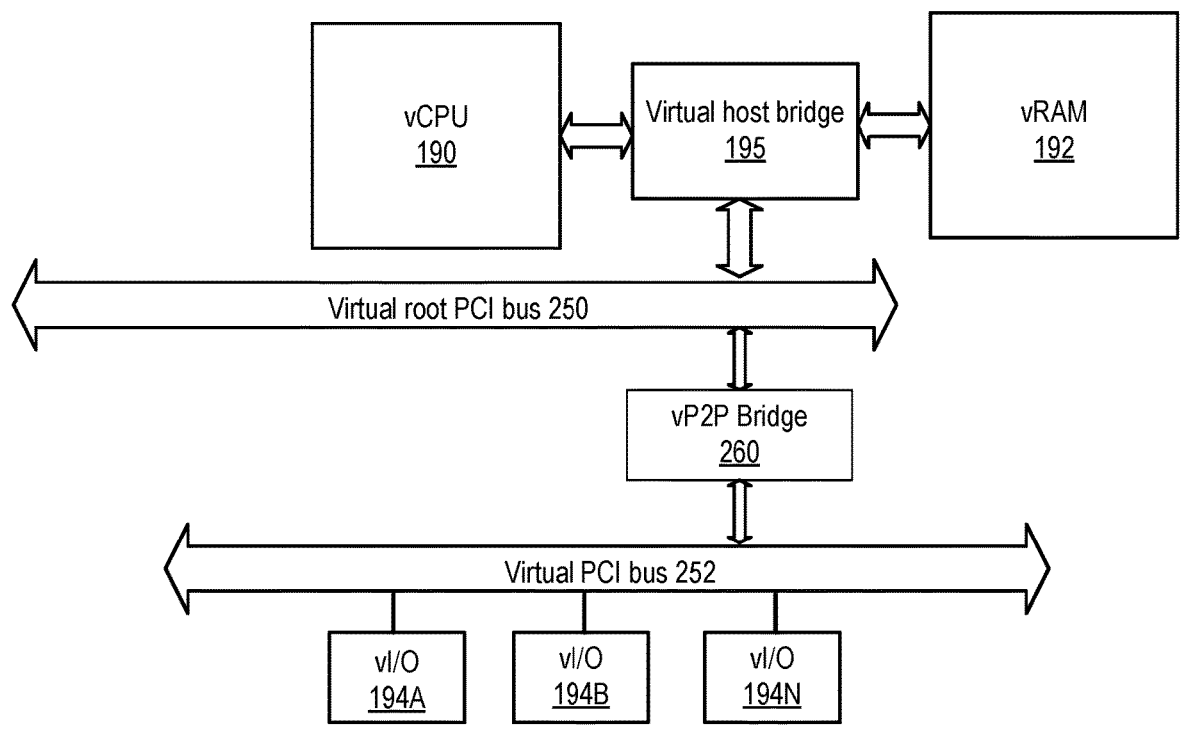

FIG. 1B schematically illustrates an example virtual machine 125, in accordance with one or more aspects of the present disclosure. Device management component 137 of FIG. 1A may be programmed to intercept virtual machine 125 memory read/write and/or input/output (I/O) operations with respect to certain memory and/or I/O port ranges within the PCI Configuration Space, in order to present to virtual machine 125 one or more virtual PCI devices 194A-194N attached to virtual PCI root bus 250.

In an illustrative example, Device management component 137 may notify virtual machine 125 of the presence of virtual root PCI bus 250. Device management component 137 may further present to virtual machine 125, by intercepting virtual machine memory read/write and/or input/output (I/O) operations with respect to certain memory and/or I/O port ranges within the PCI Configuration Space, one or more PCI devices 194A-194N attached to virtual PCI bus 252, which is attached to virtual root PCI bus 250 via a virtual PCI-to-PCI bridge 260.

A guest firmware being executed by virtual machine 125 may, at the virtual machine startup, scan virtual root PCI bus 250B. "Guest firmware" herein refers to the executable code that is being executed in the context of a virtual machine to perform the functions of PCI BIOS. Device management component 137 may intercept the virtual machine memory and/or I/O port read operations and present, to virtual machine 125, a virtual PCI-to-PCI bridge 260 associated with virtual root PCI bus 250, and further present a secondary virtual PCI bus 252 connected to the other side of virtual PCI-to-PCI bridge 260.

Responsive to detecting a PCI-to-PCI bridge 260 associated with root PCI bus 250B, the guest firmware may identify virtual PCI bus 252 that is communicatively coupled to the other side of PCI-to-PCI bridge 260. The guest firmware may then scan the identified virtual PCI bus 252. Device management component 137 may intercept the virtual machine memory and/or I/O port read operations and present, to virtual machine 125, one or more virtual PCI devices connected to virtual PCI bus 252.

The guest firmware may query all PCI devices via the PCI Configuration Space to identify the devices that are present and determine what system resources (memory space, I/O space, interrupt lines, etc.) each device needs. For each PCI device 194A-194N detected on virtual PCI bus 252, the guest firmware may add, to a resource pool (memory address range or I/O port number range) associated with PCI-to-PCI bridge 260, the system resources allocated to PCI device 194. The guest firmware may allocate the resources for multiple PCI devices attached to PCI bus 252 using contiguous address ranges (e.g., memory address ranges or I/O port number ranges), thus optimizing the efficiency of system resource allocation.

The guest firmware may further allocate certain resource address ranges to PCI-to-PCI bridge 260, for later allocation to eventual hot-plugged PCI devices. The hypervisor may then associate the allocated pools of resources (e.g., memory address ranges and/or I/O port number ranges) with root PCI bus 250B and notify the guest operating system by modifying the corresponding entries of a system configuration table. In certain implementations, the system configuration tables may conform to the Advanced Configuration and Power Interface (ACPI) Specification that defines an open standard for device configuration and power management functions by an operating system, including definitions of several system configuration tables.

Figure 2:
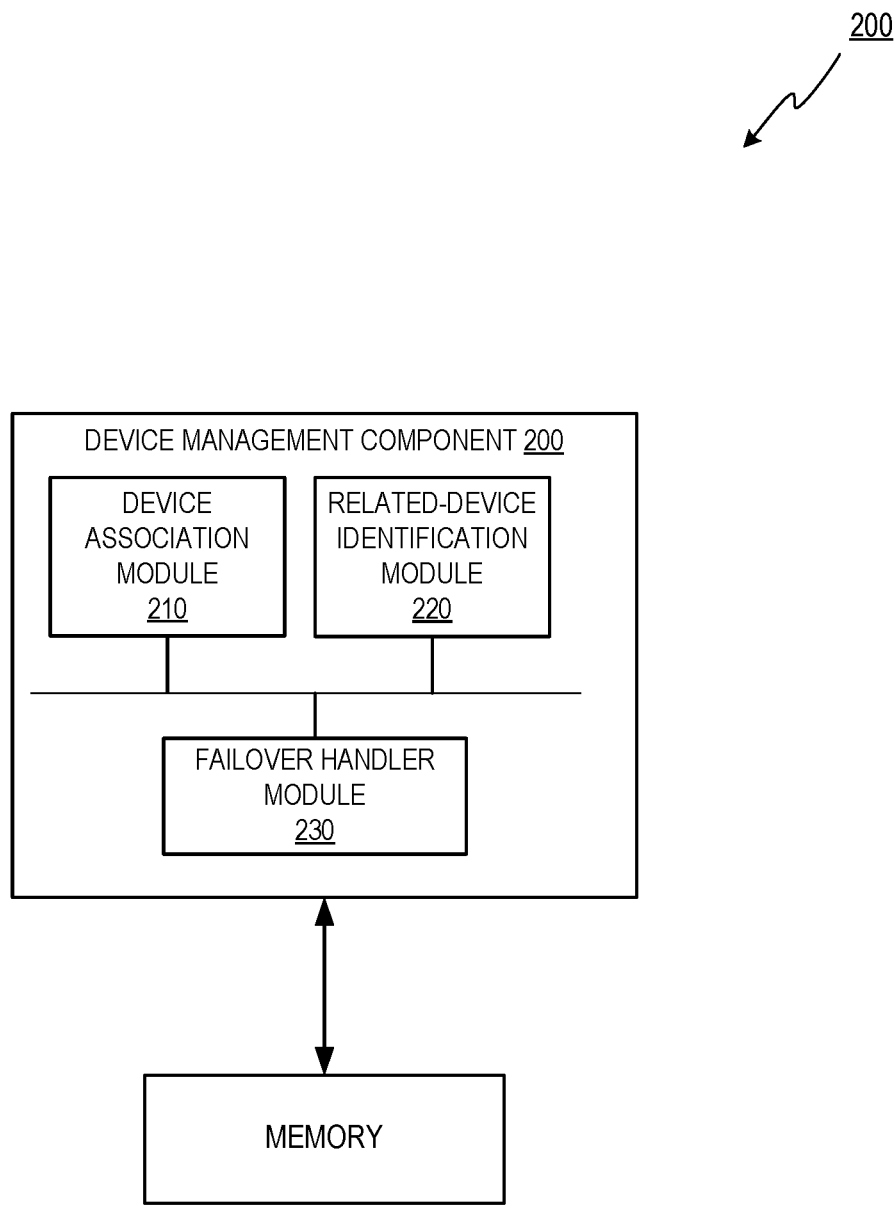
FIG. 2 is a block diagram of a detailed view of a computer system implementing a device management component component according to an implementation of the disclosure.

FIG. 2 depicts a block diagram illustrating an example device management component 200 in accordance with some implementations of the disclosure. The device management component of FIG. 2 may be same as the device management component 137 of FIG. 1. As illustrated, the device management component 200 may include a device association module 210, a related-device identification module 220 and a failover handler module 230. More or fewer components may be included without loss of generality. For example, two or more of the components or portions of the components may be combined into a single component, or one of the components may be divided into two or more modules. In one implementation, one or more of the modules may be executed by different processing devices on different computing devices (e.g., different server computers).

The device association module 210 may associate related devices for a virtual machine. The related devices may include, for example, a first device and a second device in a failover relationship. In some embodiments, the first device and the second device may be an emulated device and a passthrough device, respectively. To associate the first device with the second device as related devices (e.g., failover devices) of the virtual machine, the device associate module 210 may present the first device to a guest OS of the virtual machine as a bridge device (e.g., a PCI-to-PCI device). For example, the device association module 210 may set one or more registers of the first device (e.g., "Header Type" register of the first device) as the bridge device. The device association module 210 may then present the second device as a device residing behind the bridge device. For example, the device association module 210 can set one or more registers of the second device to indicate that the second device is an endpoint attached to the bridge device.

The related-device identification module 220 can identify related devices associated with the virtual machine. In some embodiments, the identification may be made in view of a failover event. As an example, to identify a device related to the first device, the related-device identification module 220 may obtain data about one or more registers of the first device (e.g., one or more registers of a PCI configuration space of the first device). In some embodiments, the obtained data may include one or more identifiers of one or more devices residing behind the bridge device. Each of the identifiers may include an address assigned to a device residing behind the bridge device. The address may include a bus number (e.g., a secondary bus number) in some embodiments.

The related-device identification module 220 can then identify one or more devices related to the first device (e.g., a failover device of the first device) in view of the obtained data about the registers of the first device. For example, the related-device identification module 220 can identify, in view of the data, a device residing behind the bridge device as the second device.

The failover handler module 230 can perform operations to enable device failover for the virtual machine. For example, the failover handler module 230 can detect a failover event related to the first device or the second device. The failover handler module 230 may then cause the virtual machine to switch to a failover device. In one implementation, the failover handler module 230 may detect a first failover related to the first device (e.g., a failure to perform one or more operations by the first device). The failover handler module 230 may cause the virtual machine to switch to the second device in response to detecting the first failover event. For example, the failover handler module 230 can send one or more communications to the guest OS of the virtual machine to bind to a device driver associated with the second device (e.g., a passthrough device driver). The failover handler module 230 may also activate the device driver associated with the second device to expose the second device to the virtual machine.

In another implementation, the failover handler module 230 may detect a second failover related to the second device (e.g., a failure to perform one or more operations by the second device). The failover handler module 230 may cause the virtual machine to switch to the first device in response to detecting the second failover event. For example, the failover handler module 230 can send one or more communications to the guest OS of the virtual machine to bind to a device driver associated with the first device (e.g., an emulated device driver). The failover handler module 230 may also activate the device driver associated with the first device to expose the first device to the virtual machine.

Figure 3:
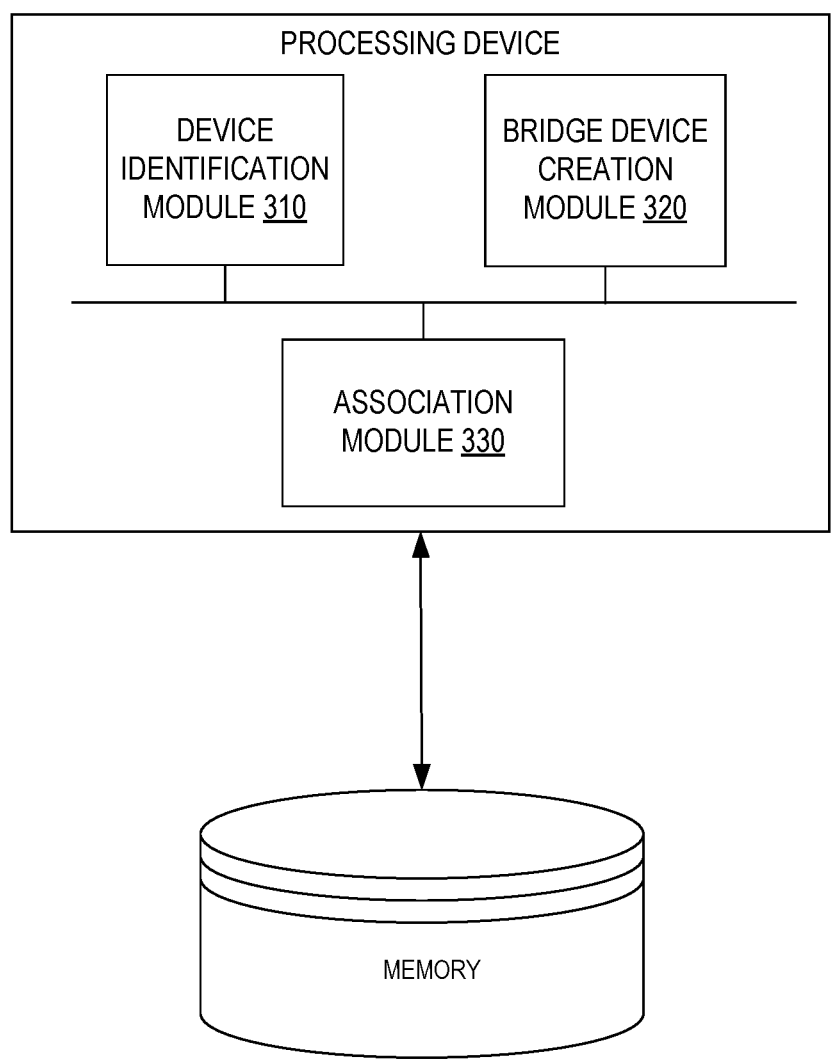
FIGS. 3, 4, and 5 depict block diagrams of example computer systems operating in accordance with one or more aspects of the present disclosure.
Figure 4:
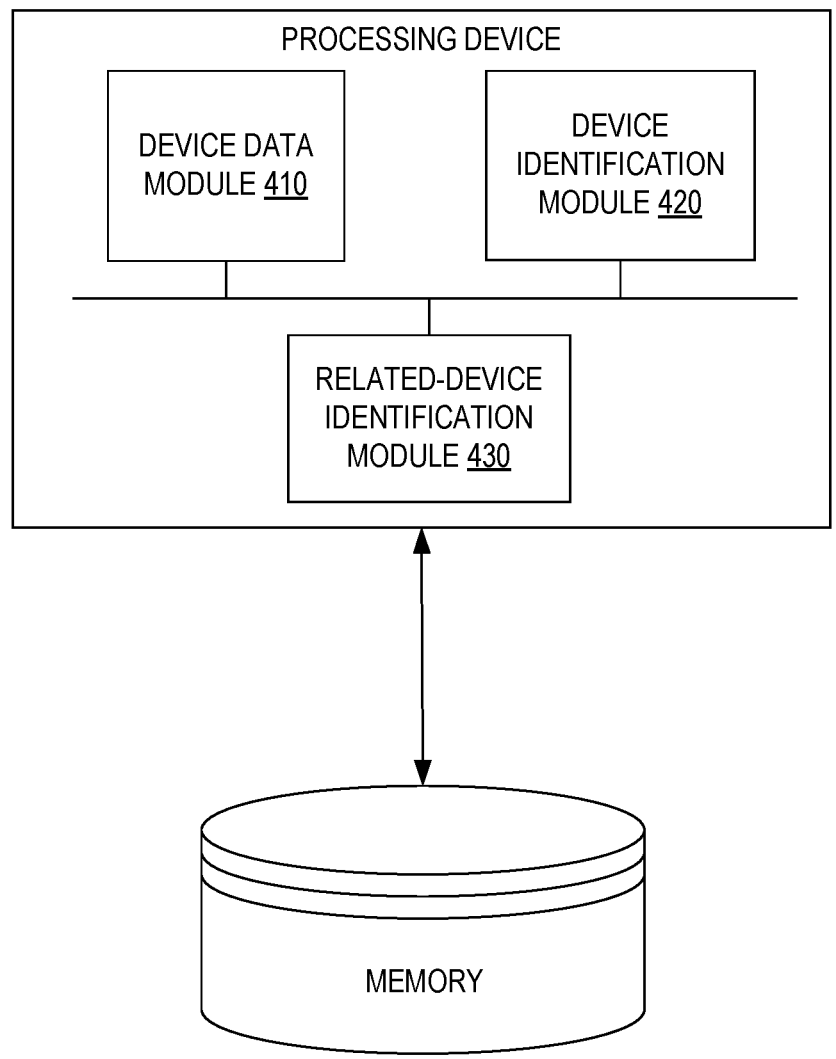
Figure 5:
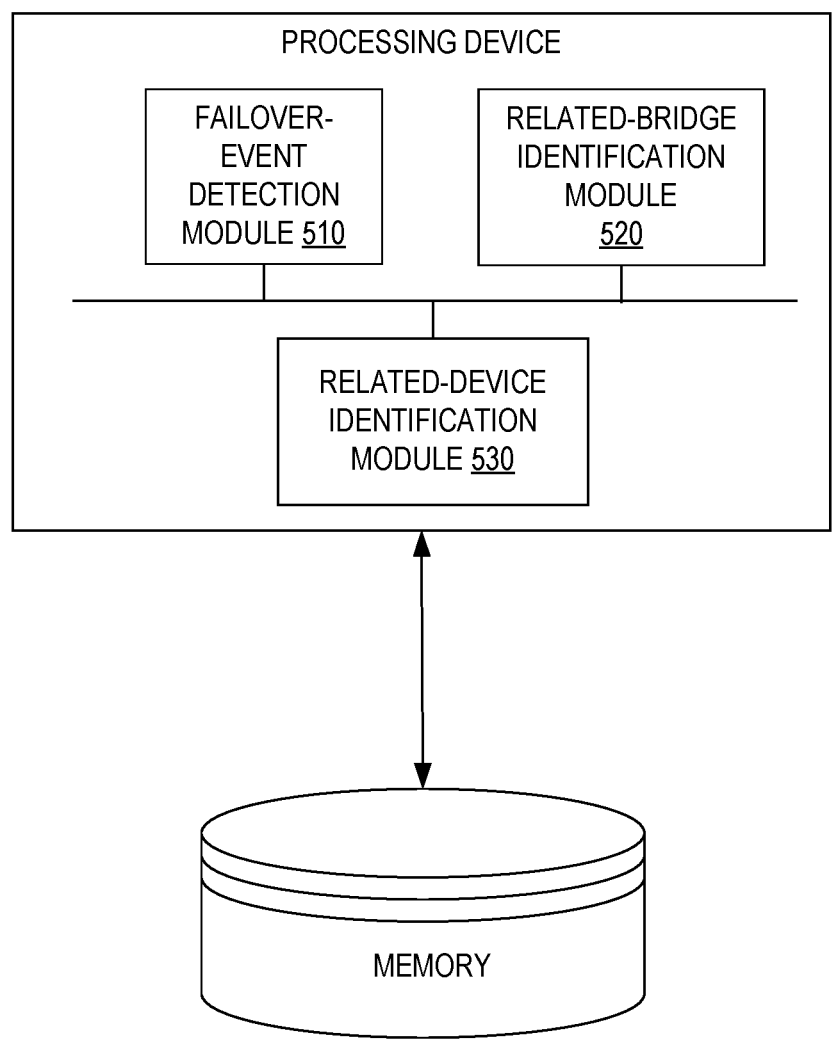

FIGS. 3, 4, and 5 depict block diagrams of example computer systems operating in accordance with one or more aspects of the present disclosure. Each of computer systems 300, 400, and 500 may be the same or similar to computer system 100A and may include one or more processing devices and one or more memory devices. Each of computer systems 300, 400, and 500 may further include a memory storing data in accordance with the present disclosure.

Referring to FIG. 3, computer system 300 may include a device identification module 310, a bridge device creation module 320, and an association module 330.

The device identification module 310 may identify one or more devices to be assigned to a virtual machine. For example, the device identification module 310 can identify a first device and a second device that are in a failover relationship. In some embodiments, the first device may be an enumerated device (e.g., a paravirtualized device). The second device may be a passthrough device. In some embodiments, the second device may be a primary device to be used by the virtual machine to perform certain operations. The first device may be used to perform the operations for the virtual machine when the primary device is not available (e.g., when the primary device experiences an error) and/or upon detection of a predetermined event (e.g., a failover event).

The bridge device creation module 320 can present one or more of the identified devices to the virtual machine as a bridge device. The bridge device may be, for example, a PCI-to-PCI bridge. For example, the bridge device creation module 320 can present the first device to a guest operating system of the virtual machine as a bridge device. For example, the bridge device creation module 320 can set values of one or more registers of the first device to indicate that the first device is the bridge device (e.g., by setting a "Header Type" register of a PCI reconfiguration space of the first device to values corresponding to the bridge device). The bridge device creation module 320 can also perform one or more operations as described in connection with FIG. 1B to present the first device as the bridge device.

The association module 330 may perform one or more operations to associate the identified devices with each other and/or to indicate that the devices are related devices. For example, the association module 330 can present the second device to the guest operating system of the virtual machine as a device behind the bridge (e.g., setting one or more values of one or more registers of the second device to indicate that the second device is an endpoint device attached to the bridge device). The association module 320 can also perform one or more operations as described in connection with FIG. 1B to present the second device as the device residing behind the bridge device.

In some embodiments, the association module 330 may also associate the first device and/or the second device with a device driver configured to cause the virtual machine to switch between the first device and the second device in view of failover events (e.g., a failover driver as described herein). For example, the association module 330 can set values of one or more registers of the first device in view of device data related to the device driver. In some embodiments, the association module 330 can set values of one or more registers of a PCI configuration space (e.g., a "Vendor ID" register, a "Device ID" register) to values corresponding to the device data (e.g., a vendor identifier, a device identifier).

Referring to FIG. 4, computer system 400 may include a device data module 410, a device identifier module 420, and a related-device identification module 430.

The device data module 410 can obtain data about one or more devices, such as devices associated with a failover device driver. For example, the device data module 410 can obtain data about one or more registers of a first device that is presented to a guest operating system of a virtual machine as a bridge device (e.g., a PCI-to-PCI bridge). The registers may be and/or include one or more registers of a PCI configuration space of the first device. In some embodiments, the data may be obtained via the failover device driver. For example, the failover device driver may request the data from another device driver (e.g., an emulated device driver associated with the fist device).

The device identifier module 420 may determine, in view of the data obtained by the device data module 410, an identifier of a device that is attached to the first device. The identifier may be, for example, an address assigned to an endpoint device behind the bridge device (e.g., a bus number).

The related-device identification module 430 can identify, in view of the identifier, a second device as a failover device of the first device. The second device may be a passthrough device. For example, the related-device identification module 430 may identify a device associated with the identifier as the second device.

Referring to FIG. 5, computer system 500 may include a failover-event detection module 510, a related-device identification module 520, and a failover event handler module 530.

The failover-event detection module 510 can detect failover events related to one or more devices assigned to a virtual machine. The failover events may include, for example, an error and/or operation failure related to one or more of the devices, a request to migrate the virtual machine, etc. For example, the failover-event detection module 510 can detect a first failover event related to a first device assigned to the virtual machine. The first device may be an emulated device (e.g., a paravirtualized device) and may be presented to a guest operating system of the virtual machine as a bridge device (e.g., a PCI-to-PCI device). As another example the failover-event detection module 510 may detect a second failover event related to a second device assigned to the virtual machine. The second device may be a passthrough device.

The related-device identification module 520 can identify a failover device of a device assigned to the virtual machine in view of a failover event related to the assigned to the virtual machine. For example, the related-device identification module 520 can identify the second device in response to detecting the first failover event related to the first device (e.g., by determining that the second device is attached to the bridge device corresponding to the first device). The second device may be identified, for example, by performing one or more operations as described in connection with FIGS. 4 and 7. As another example, the related-device identification module 520 can identify the first device in response to detecting the second failover event related to the second device (e.g., by determining that the first device corresponds to the bridge device and/or that the first device is associated with a failover device driver associated with the second device).

The failover event handler module 530 can assign the first device and/or the second device to the virtual machine in view of one or more failover events. For example, the failover event handler module 530 can assign the second device to the virtual machine in view of a failover event related to the first device. As another example, the failover event handler module 530 can assign the first device to the virtual machine in view of a failover event related to the second device.

Figure 6:
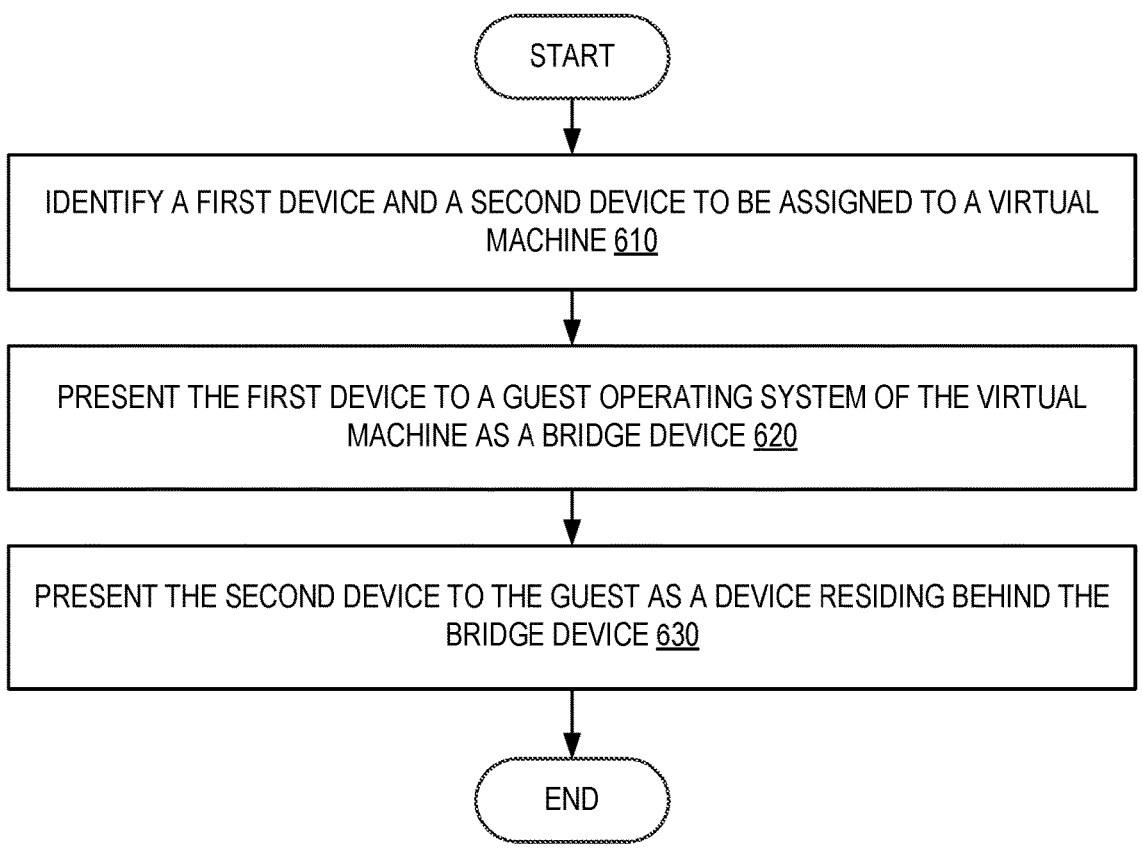
FIG. 6 is a flow diagram illustrating a method for associating related devices in a computer system in accordance with some embodiments of the present disclosure.
Figure 7:
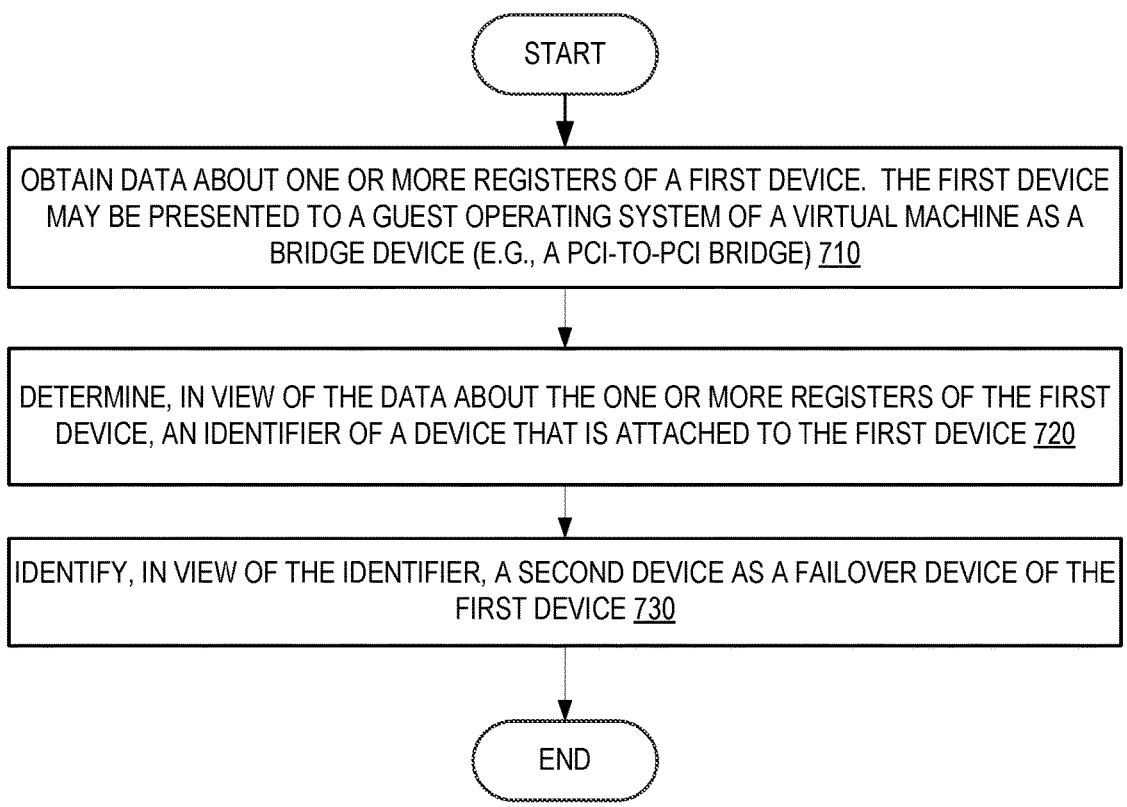
FIG. 7 is a flow diagram illustrating a method for identifying related devices in accordance with some embodiments of the present disclosure.
Figure 8:
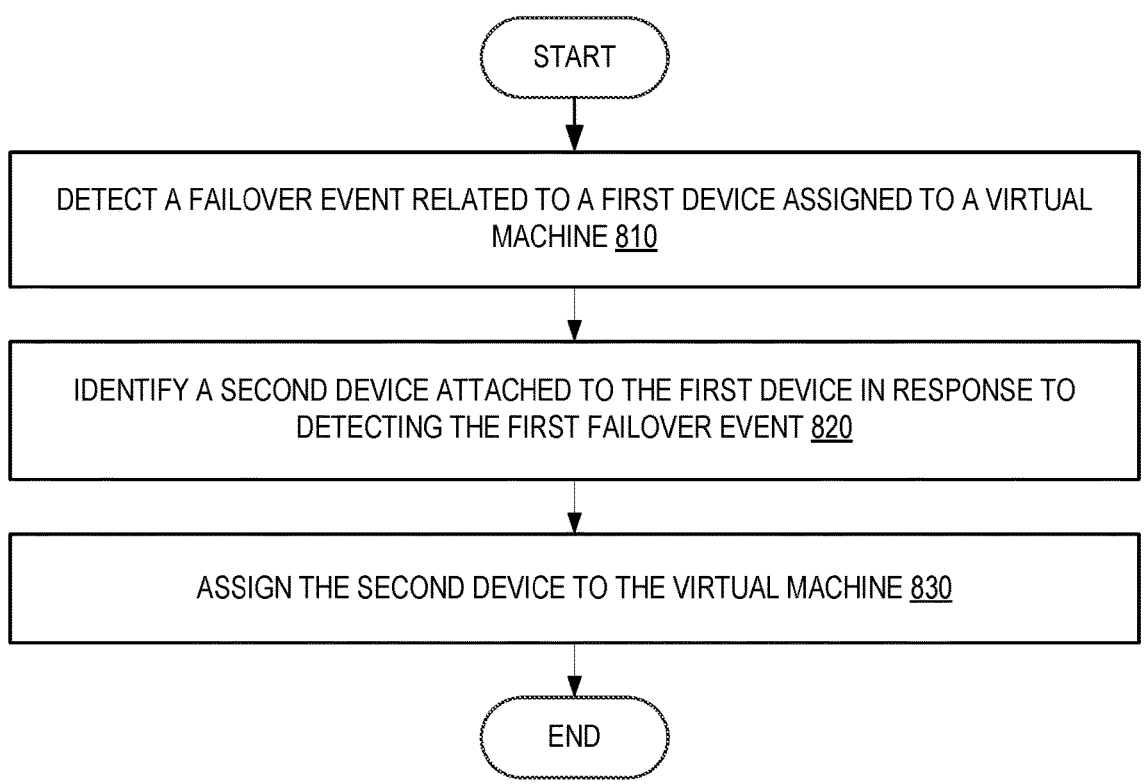
FIG. 8 is a flow diagram illustrating a method for handling a failover event in accordance with some embodiments of the present disclosure.

FIGS. 6, 7, and 8 are flow diagrams illustrating methods 600, 700, and 800 for memory management in a virtualized computer system in accordance with one or more aspects of the present disclosure. Method 600 illustrates an example process for associating related devices in accordance with some embodiments of the present disclosure. Method 700 illustrates an example process for identifying a device related to a first device in accordance with some embodiments of the present disclosure. Method 800 illustrates an example process for handling a failover event in accordance with some embodiments of the present disclosure. Methods 600, 700, and 800 may be performed by processing devices that may comprise hardware (e.g., circuitry, dedicated logic, programmable logic, microcode, etc.), executable code (such as is run on a general-purpose computer system or a dedicated machine), or a combination of both. Methods 600, 700, and 800 and each of their individual functions, routines, subroutines, or operations may be performed by one or more processors of the computer device executing the method. In certain implementations, methods 600, 700, and 800 may each be performed by a single processing thread. Alternatively, methods 600, 700, and 800 may be performed by two or more processing threads, each thread executing one or more individual functions, routines, subroutines, or operations of the method. In an illustrative example, the processing threads implementing methods 600, 700, and 800 may be synchronized (e.g., using semaphores, critical sections, and/or other thread synchronization mechanisms). Alternatively, the processes implementing methods 600, 700, and 800 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 600, 700, and 800 may be performed by computer system 100 as shown in FIG. 1.

Referring to FIG. 6, method 600 begins at block 610 where the processing device may identify a first device and a second device to be assigned to a virtual machine. The first device and the second device may be in a failover relationship. For example, the second device may be a primary device to be used by the virtual machine to perform certain operations. The first device may be used to perform the operations for the virtual machine when the primary device is not available (e.g., when the primary device experiences an error) and/or upon detection of a predetermined event (e.g., a failover event). As such, the first device may be regarded as being a failover device of the second device. In some embodiments, the first device may be an emulated device (e.g., a paravirtualized device) device. The second device may be a pass-through device.

At block 620, the processing device can present the first device to a guest operating system of the virtual machine (e.g., the "guest") as a bridge device. The bridge device may be, for example, a PCI-to-PCI bridge. In some embodiments, the processing device can present the first device to the guest as the bridge device by setting one or more values of one or more registers of the first device to indicate that first device is a bridge device. As an example, the first device may be a PCI device and the processing device can set a value of a register of a PCI configuration space of the first device as a value indicating that the first device is a bridge device (e.g., by setting a "Header Type" register to one or more values corresponding to a bridge device).

At block 630, the processing device can present the second device to the guest as a device residing behind the bridge device. For example, the processing device can set one or more values of one or more registers of the second device to indicate that the second device is an endpoint device attached to the bridge device. The processing device may also perform one or more operations described in connection with FIG. 1B to present the second device to the guest.

In some embodiments, the first device may also be associated with a device driver configured to cause the virtual machine to switch between the first device and the second device in view of failover events (e.g., a failover driver as described herein). For example, to associate the first device with the device driver, the processing device may associate device data related to the device driver with the first device. The device data may include, for example, a vendor identifier, a device identifier, etc. In some embodiments, the processing device may associate the device data with the first device by setting values of one or more registers of the first device (e.g., one or more registers of a PCI configuration space) in view of the device data (e.g., by setting the values to correspond to the vendor identifier and/or the device identifier).

Referring to FIG. 7, method 700 begins at block 710 where a processing device executing a hypervisor may obtain data about one or more registers of a first device. The first device may be presented to a guest operating system of a virtual machine as a bridge device (e.g., a PCI-to-PCI bridge). The first device may be associated with a failover device driver. The first device may be an emulated device (e.g., a paravirtualized device). The one or more registers of the first device may be and/or include one or more registers of a PCI configuration space of the first device. The data about the registers of the first device may include one or more values of the PCI configuration space. For example, the obtained data may include one or more identifiers of one or more devices residing behind the bridge device. Each of the identifiers may include an address assigned to a device residing behind the bridge device. The address may include a bus number (e.g., a secondary bus number) in some embodiments.

In some embodiments, the data may be obtained by a first device driver from a second device driver (e.g., by requesting and receiving the data from the from the second device driver). The first driver may be a failover driver that is configured to cause a virtual machine to switch between the first device and the second device in view of failover events. The second device driver may be configured to manage the first device and/or one or more devices attached to the first device. The second device driver may be an emulated device driver that may enable the first device to perform one or more functions.

At block 720, the processing device can determine, in view of the data about the one or more registers of the first device, an identifier of a device that is attached to the first device. The identifier may be, for example, an address assigned to an endpoint device behind the bridge device. The address may be and/or include a bus number.

At block 730, the processing device can identify, in view of the identifier, a second device as a failover device of the first device. The second device may be a passthrough device. The processing device may also access, via the failover device driver, the second device using the identifier. For example, the failover device driver may access the second device using a combination of a bus number included in the identifier, a device number, a function of the passthrough device, etc.

Referring to FIG. 8, method 800 begins at block 810 where the processing device may detect a failover event related to a first device assigned to a virtual machine. The first device may be an emulated device and may be presented to a guest operating system of the virtual machine as a bridge device (e.g., a PCI-to-PCI device). The failover event may be any event that may indicate and/or trigger a virtual machine to switch from the first device to a second device. The failover event may include, for example, an error and/or operation failure related to the first device, a request to migrate the virtual machine, etc.

At block 820, the processing device can identify a second device attached to the first device in response to detecting the first failover event. The second device may be a pass-through device and may be a failover device of the first device. The second device may be identified, for example, by performing one or more operations as described in connection with FIG. 7.

At block 830, the processing device can assign the second device to the virtual machine. For example, the processing device can expose a physical device corresponding to the second device to the guest operating system of the virtual machine as a port of the virtual machine. The assignment of the second device to the virtual machine may enable the guest operating system of the virtual machine to have direct access to the physical device. In some embodiments, the processing device may also detach the first device from the virtual machine (e.g., by deactivating an emulated device driver associated with the first device).

Figure 9:
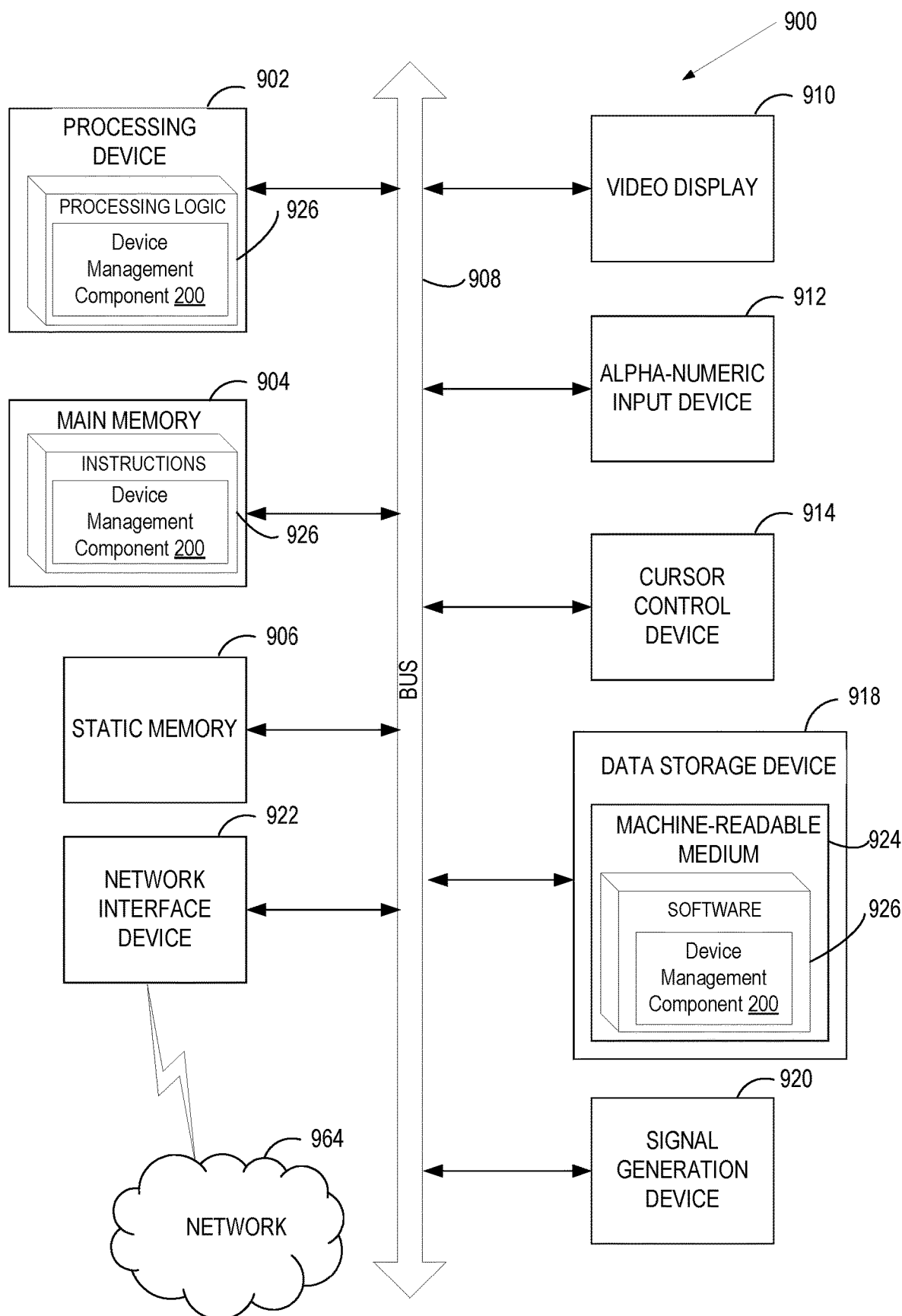
FIG. 9 illustrates a block diagram of one implementation of a computer system.

FIG. 9 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 900 includes a processing device 902 (e.g., processor, CPU, etc.), a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 408.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 900 may further include a network interface device 922 communicably coupled to a network 964. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a machine-readable storage medium 924 on which is stored software 926 embodying any one or more of the methodologies of functions described herein. The software 926 may also reside, completely or at least partially, within the main memory 404 as instructions 926 and/or within the processing device 902 as processing logic 926 during execution thereof by the computer system 900; the main memory 904 and the processing device 902 also constituting machine-accessible storage media.

The machine-readable storage medium 924 may also be used to store instructions 926 to manage devices for virtual machines, such as the scheduler component 137 as described with respect to FIGS. 1A-2, and/or a software library containing methods that call the above applications. While the machine-readable storage medium 924 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Other computer system designs and configurations may also be suitable to implement the system and methods described herein. The following examples illustrate various implementations in accordance with one or more aspects of the present disclosure.

Example 1 includes a method comprising: identifying, by a processing device executing a hypervisor, a first device and a second device to be assigned to a virtual machine, wherein the first device is a failover device of the second device; presenting, by the processing device, the first device to a guest operating system of the virtual machine as a bridge device; and presenting, by the processing device, the second device to the guest operating system of the virtual machine as residing behind the bridge device.

Example 2 includes the subject matter of example 1, wherein the bridge device is a Peripheral Component Interconnect (PCI)-to-PCI bridge.

Example 3 includes the subject matter of example 1, wherein the first device is an emulated device, and wherein the second device is a passthrough device.

Example 4 includes the subject matter of example 3, wherein presenting the first device to the guest operating system of the virtual machine as the bridge device comprises: setting one or more values of at least one register of the first device to indicate that the first device is the bridge device.

Example 5 includes the subject matter of example 4, wherein presenting, by the processing device, the second device to the guest operating system of the virtual machine as residing behind the bridge device comprises: setting one or more values of at least one register of the second device to indicate that the second device is an endpoint device attached to the bridge device.

Example 6 includes the subject matter of example 1, further comprising: associating device data related a device driver with the first device, wherein the device driver is configured to cause the virtual machine to switch between the first device and the second device in view of one or more failover events.

Example 7 includes the subject matter of example 6, wherein associating the device data related to the device driver with the first device comprises setting one or more values of at least one register of the first device in view of the device data.

Example 8 includes the subject matter of example 7, wherein the device data comprises at least one of a vendor identifier or a device identifier.

Example 9 includes the subject matter of example 6, wherein the one or more failover events comprise at least one of a request to migrate the virtual machine, an indication that at least one of the first device or the second device is not available, or a request for resource overcommit.

Example 10 includes a method comprising: obtaining data about one or more registers of a first device, wherein the first device is presented to a guest operating system of a virtual machine as a bridge device; determining, in view of the data about the one or more registers of the first device, an identifier of a device behind the bridge device; and identifying, in view of the identifier, a second device as a failover device of the first device.

Example 11 includes the subject matter of example 10, wherein the bridge device is a Peripheral Component Interconnect (PCI)-to-PCI bridge.

Example 12 includes the subject matter of example 10, wherein the first device comprises an emulated device, and wherein the second device comprises a passthrough device.

Example 13 includes the subject matter of example 10, wherein obtaining the data about the one or more registers of the first device comprises: requesting, by a first device driver, the data about the one or more registers of the first device from a second device driver, wherein the first device driver is configured to cause the virtual machine to switch between the first device and the second device in view of one or more failover events.

Example 14 includes the subject matter of example 13, wherein the second device driver is configured to provide functionality of the first device.

Example 15 includes the subject matter of example 13, further comprising: accessing, by the first device driver, the second device using the identifier.

Example 16 includes the subject matter of example 13, wherein the first device is associated with device data related to the first device driver.

Example 17 includes the subject matter of example 16, wherein the data about the one or more registers of the first device comprises the device data.

Example 18 includes the subject matter of example 10, wherein the identifier of the device that is attached to the bridge device comprises an address assigned to the second device.

Example 19 includes the subject matter of example 18, wherein the address assigned to the second device comprises a bus number.

Example 20 includes a method, comprising: detecting a first failover event related to a first device assigned to a virtual machine, wherein the first device is presented to a guest operating system of the virtual machine as a bridge device; in response to detecting the first failover event, identifying, by a processing device executing a hypervisor, a second device attached to the bridge device; and assigning, by the processing device, the second device to the virtual machine.

Example 21 includes the subject matter of example 20, wherein the first device comprises an emulated device, and wherein the second device comprises a passthrough device.

Example 22 includes the subject matter of example 20, further comprising: detecting a second failover event related to the second device; and assigning the first device to the virtual machine in response to detecting the second failover event.

Example 23 includes the subject matter of example 22, further comprising detaching the first device from the virtual machine.

Example 24 includes the subject matter of example 20, wherein identifying the second device comprises: obtaining data about one or more registers of the first device; determining, in view of the data about the one or more registers of the first device, an identifier of a device behind the bridge device; and identifying, in view of the identifier, the second device as a failover device of the first device.

Example 25 includes the subject matter of example 24, wherein the data about the one or more registers of the first device comprises the device data.

Example 26 includes the subject matter of example 24, wherein the identifier of the device that is attached to the bridge device comprises an address assigned to the second device.

Example 27 includes the subject matter of example 26, wherein the address assigned to the second device comprises a bus number.

Example 28 includes the subject matter of example 20, wherein the bridge device is a Peripheral Component Interconnect (PCI)-to-PCI bridge.

Example 29 includes the subject matter of example 20, wherein the first device and the second device are bound to a failover device driver configured to cause the virtual machine to switch between the first device and the second device.

Example 30 includes the subject matter of example 29, wherein at least one register of the first device comprises data corresponding to device data related to the device driver.

Example 31 includes an apparatus comprising: a processing device; and a means for identifying a first device and a second device to be assigned to a virtual machine, wherein the first device is a failover device of the second device; a means for presenting, by the processing device, the first device to a guest operating system of the virtual machine as a bridge device; and a means for presenting, by the processing device, the second device to the guest operating system of the virtual machine as residing behind the bridge device.

Example 32 includes the subject matter of example 31, further comprising the subject matter of any of claims 1-30.

Example 33 is a system comprising: a memory; and a processing device operatively coupled to the memory, the processing device to implement the subject matter of any of examples 1-30.

Example 34 is a non-transitory machine-readable storage medium including instructions that, when accessed by a processing device, cause the processing device to implement the subject matter of any of examples 1-30.

Unless specifically stated otherwise, terms such as "receiving," "invoking," "associating," "providing," "storing," "performing," "detecting," "initiating," "obtaining," "generating," "determining," "updating," "modifying," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 600, 700, and 800 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
   obtaining data about one or more registers of a first device, wherein the first device is presented to a guest operating system of a virtual machine as a bridge device, and wherein presenting the first device to the guest operating system comprises setting one or more values of at least one register of the first device to indicate that the first device is the bridge device;
   determining, in view of the data about the one or more registers of the first device, an identifier of a device behind the bridge device; and
   identifying, in view of the identifier, a second device as a failover device of the first device, wherein the first device comprises an emulated device and the second device comprises a passthrough device.

2. The method of claim 1, wherein the bridge device is a Peripheral Component Interconnect (PCI)-to-PCI bridge.

3. The method of claim 1 further comprising:
   setting one or more values of at least one register of the second device to indicate that the second device is an endpoint device attached to the bridge device.

4. The method of claim 1, wherein obtaining the data about the one or more registers of the first device further comprises:
   requesting, by a first device driver, the data about the one or more registers of the first device from a second device driver, wherein the first device driver is configured to cause the virtual machine to switch between the first device and the second device in view of one or more failover events.

5. The method of claim 4, wherein associating the device data related to the device driver with the first device comprises setting one or more values of at least one register of the first device in view of the device data.

6. The method of claim 5, wherein the device data comprises at least one of a vendor identifier or a device identifier.

7. The method of claim 1, wherein the identifier of the device that is attached to the bridge device comprises an address assigned to the second device.

8. A system comprising:
   a memory; and
   a processing device operatively coupled to the memory, the processing device to:
   obtain data about one or more registers of a first device, wherein the first device is presented to a guest operating system of a virtual machine as a bridge device;
   determine, in view of the data about the one or more registers of the first device, an identifier of a device behind the bridge device; and
   identify, in view of the identifier, a second device as a failover device of the first device.

9. The system of claim 8, wherein the bridge device is a Peripheral Component Interconnect (PCI)-to-PCI bridge.

10. The system of claim 8, wherein the first device comprises an emulated device, and wherein the second device comprises a passthrough device.

11. The system of claim 8, wherein, to obtain the data about the one or more registers of the first device, the processing device is further to:
    request, by a first device driver, the data about the one or more registers of the first device from a second device driver, wherein the first device driver is configured to cause the virtual machine to switch between the first device and the second device in view of one or more failover events.

12. The system of claim 11, wherein the second device driver is configured to provide functionality of the first device.

13. The system of claim 11, wherein the processing device is further to access, via the first device driver, the second device using the identifier.

14. The system of claim 11, wherein the first device is associated with device data related to the first device driver.

15. The system of claim 14, wherein the data about the one or more registers of the first device comprises the device data.

16. The system of claim 8, wherein the identifier of the device that is attached to the bridge device comprises an address assigned to the second device.

17. The system of claim 16, wherein the address assigned to the second device comprises a bus number.

18. A non-transitory machine-readable storage medium including instructions that, when accessed by a processing device, cause the processing device to:
- obtain data about one or more registers of a first device, wherein the first device is presented to a guest operating system of a virtual machine as a bridge device;
- determine, in view of the data about the one or more registers of the first device, an identifier of a device behind the bridge device; and
- identify, in view of the identifier, a second device as a failover device of the first device.

* * * * *